A. NORREL.
APPARATUS FOR TRUING-UP COMMUTATORS OF ELECTRIC MACHINES.
APPLICATION FILED DEC. 9, 1916.

1,249,655.

Patented Dec. 11, 1917.

Inventor:
Anders Norrel.
By Albert V. Parker
Attorney.

UNITED STATES PATENT OFFICE.

ANDERS NORREL, OF BADEN, SWITZERLAND.

APPARATUS FOR TRUING UP COMMUTATORS OF ELECTRIC MACHINES.

1,249,655.  Specification of Letters Patent.  Patented Dec. 11, 1917.

Application filed December 9, 1916. Serial No. 136,100.

*To all whom it may concern:*

Be it known that I, ANDERS NORREL, a subject of the King of Sweden, and residing at Grendelstrasse 161, Baden, Switzerland, have invented certain new and useful Improvements in Apparatus for Truing Up Commutators of Electric Machines, of which the following is a specification.

This invention relates to commutator truing-up apparatus, and has for an object to provide an apparatus with two adjustable plates which can be fixed direct to the fixed parts of electric machines in nearly all cases without it being necessary to remove parts of these machines. For truing, a block of carborundum stone for instance is used that has the form of a rectangular bar and is nearly as long as the commutator face. The grinding block retained by a clamping device can be kept stationary to obtain a perfectly true commutator surface. If desired, it can also be pressed more or less against the commutator, that is to say, it can be moved radially to the commutator, as well as moved in the longitudinal sense of the commutator, or other piece to be trued, this to obtain a perfectly straight, smooth and cylindric surface.

For a full understanding of the invention, reference is to be had to the following description and accompanying drawing in which:—

Figure 1:
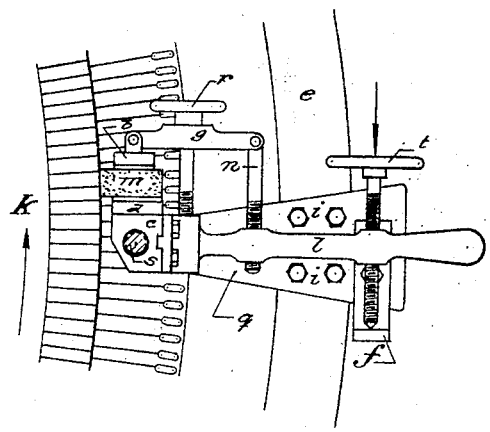
Figure 1 is a side view of the complete apparatus, showing a commutator to which it is applied.
Figure 2:
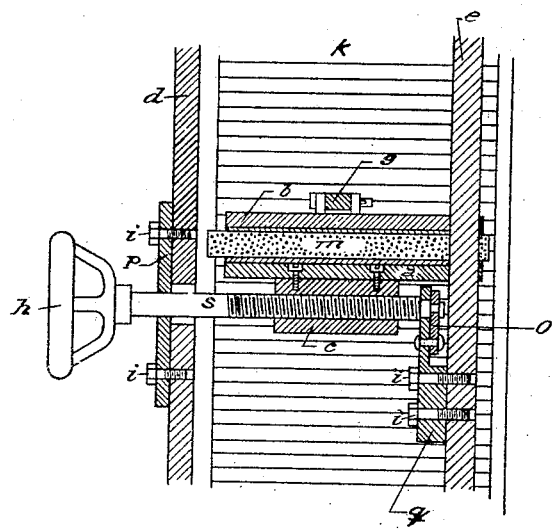
Fig. 2 is a cross section of the apparatus.

The truing apparatus is carried by two fixing plates $p$ and $q$, which are fixed by means of the screws $i$ direct to the brush rockers $d$ and $e$ rigidly fixed to the electric machine. In place of the brush rockers $d$ and $e$, any other appropriate piece fixed to the electric machine can be used for carrying the fixing plates. The fixing plates $p$ and $q$ serve as guides for and carry the bearings of the spindle $s$, and consequently guide the complete apparatus. They are screwed on in such a position relative to each other that the spindle $s$ lies parallel to the axis of the commutator $k$. One of the fixing plates $q$ is provided with a spindle retaining plate $o$ which fits into a circular groove turned in the spindle $s$. Thereby the spindle $s$ is prevented from moving longitudinally when the handwheel $h$ is turned. On the spindle $s$ is placed a traveling nut $c$ to which are fixed by means of screws a tilting lever $l$ and a clamping plate $a$. The grinding block $m$ is clamped between the plates or jaws $a$ and $b$ by means of screw $r$ which presses the clamping piece $g$, held and guided by fulcrum strut $n$, against the grinding block. By this clamping device the grinding block can be maintained in the apparatus in the desired position. To prevent the grinding block from breaking, pieces of card board are inserted between grinding block and clamping plates or jaws.

The truing apparatus is (as shown on the drawing) so constructed that it moves around the axis of the spindle $s$ which remains stationary. It is also possible to bring the grinding block more or less in touch with the commutator by moving the tilting lever $l$. For the purpose of bringing the grinding block into a given stationary position, but one movable with regard to the commutator, the tilting lever $l$ is provided with an adjusting screw $t$. This adjusting screw is slightly pressed down by hand on the fixed resting plate $f$ during the whole grinding process. If the adjusting screw $t$ is screwed farther in the tilting lever $l$, the latter moves upward, and the grinding block approaches the commutator. During the grinding process the rotor is kept running. As soon as the grinding block is so near the commutator that it begins to grind the projecting parts, the adjusting screw $t$ pressed against the fixed resting plate $f$ is kept stationary. This causes the grinding block to remain stationary too. It can therefore only grind the projecting copper parts, and cannot possibly penetrate into the recesses of the untrue commutator. By degrees the commutator is ground more and more whereby the grinding block becomes somewhat worn down. For this reason, at short intervals the adjusting screw $t$ must by degrees be screwed in farther, which adjusts the tilting lever.

In order to obtain a perfectly smooth, cylindric surface of the commutator, and one absolutely free from grooves, etc., the grinding block is continually moved axially to the right and the left during the whole grinding period. This is effected simply by turning from time to time the handwheel of the spindle $s$ alternatively in the right and left sense. As the spindle $s$ itself is retained axially by the plate $o$, the traveling nut $c$ moves by turning around the spindle $s$, causing thus the grinding block to move axially to the right or the left according to the sense of rotation of the spindle.

When the resting plate $f$ supporting the adjusting screw $t$ is removed, the tilting lever $l$ can be moved downward to such extent that the grinding surface of the grinding block is easily accessible for removing the copper grains and grit, if such is necessary.

To take the apparatus away, it is only necessary to loosen the retaining plate $o$ and to unscrew the spindle $s$ from the traveling nut $c$, whereupon the complete apparatus can be removed.

The two bearings $p$ and $q$ of the spindle $s$ may also be made in one piece, because by this means it will be possible to fix the whole apparatus to one point only of the machine, for instance to the part $e$ only.

Having now described my invention what I claim as new and desire to secure by Letters Patent in the United States, is:—

1. An apparatus for truing up commutators of electric machines, comprising the combination of a grinding block of nearly the same length as the commutator rigidly mounted in an adjustable holder, said grinding block adapted to be traversed across the face of the commutator parallel to the axis thereof and supported on an axial traversing hand operated screw to allow of its being swung or rocked upon such screw radially to the commutator surface by means of an adjustable hand lever extension attached to the said holder; substantially as described.

2. An apparatus for truing up commutators of electric machines comprising in combination a grinding block in a holder; a screw spindle mounted in fixed bearings, operated by hand to traverse such grinding block across the face of the commutator in either direction, a hand lever extension secured to such holder with an adjusting screw thereon, contacting with a fixed abutment secured to the machine for obtaining a fine adjustment of the grinding block, substantially as described.

In testimony whereof I have affixed my signature.

ANDERS NORREL.

Witnesses:
 CARL EMERY,
 OLGA M. AURIG.

Copies of this patent may be obtained for five cents each, by addressing the "Commissioner of Patents. Washington, D. C."